United States Patent [19]
Schenker et al.

[11] Patent Number: 5,566,853
[45] Date of Patent: Oct. 22, 1996

[54] APPARATUS FOR SEALING A VESSEL UNDER PRESSURE

[75] Inventors: Alfred R. Schenker, Norristoen; Luken W. Potts, Merion, both of Pa.

[73] Assignee: VIZ Manufacturing Co, Philadelphia, Pa.

[21] Appl. No.: 210,718

[22] Filed: Mar. 18, 1994

Related U.S. Application Data

[63] Continuation-in-part of Ser. No. 5,584, Jan. 19, 1993, Pat. No. 5,296,659.

[51] Int. Cl.$^6$ .............................. F17C 1/00; B60R 21/28
[52] U.S. Cl. ........................ 220/581; 220/201; 215/263; 280/741
[58] Field of Search ................. 215/2, 263, 310; 220/89.4, 201, 373, 581; 280/736, 741, 737

[56] References Cited

U.S. PATENT DOCUMENTS

| | | | |
|---|---|---|---|
| 2,449,186 | 9/1948 | Wales | 220/89.4 |
| 4,513,873 | 4/1985 | Klaschka | 220/207 |
| 4,690,295 | 9/1987 | Wills | 220/89.4 |
| 4,949,862 | 8/1990 | Barbarits | 220/207 |
| 5,078,422 | 1/1992 | Hamiton | 280/741 |
| 5,158,740 | 10/1992 | Boatwright | 376/261 |
| 5,303,277 | 4/1994 | Yaginuma | 376/451 |

FOREIGN PATENT DOCUMENTS

| | | | |
|---|---|---|---|
| 2065623 | 7/1981 | United Kingdom | 220/373 |
| 011973 | 6/1993 | WIPO | 280/736 |

Primary Examiner—David Scherbel
Assistant Examiner—Terrence R. Till
Attorney, Agent, or Firm—John B. Sowell, ATT

[57] ABSTRACT

An apparatus and method for sealing a vessel or capsule under pressure comprises a preferred embodiment closure feature provided on a closure plate or metal wall to be sealed. The closure feature comprises a raised symmetrical protrusion having a small diameter elongated capillary aperture extending completely therethrough. The exposed end of the raised protrusion is heated by rodless welding to a molten state after filling the associated vessel. Then the exposed end of the cylindrical protrusion is allowed to cool while the surface tension of the metal in a molten state forms a convex bubble shape which completely closes the capillary in the exposed end of the cylindrical protrusion and maintains the heat affected zone from progressing radially outward where cracks could occur.

10 Claims, 9 Drawing Sheets

APPARATUS FOR SEALING A VESSEL UNDER PRESSURE

BACKGROUND OF THE INVENTION

1. Related Applications

This application is a continuation-in-part of our U.S. application Ser. No. 08/005,584 filed January 19, 1993 for a Differential Pressure Monitoring Device and Method, now U.S. Pat. No. 5,296,659.

2. Field of the Invention

The present invention relates to a structural apparatus adapted to form a seal in a monitoring device or in a pressure tank of the type used in hybrid type air bag inflators. More particularly, the present invention relates to closure features and/or closure plugs having a small hole or capillary aperture therethrough which is welded closed in the presence of gas under pressure without adding weld metal.

3. Description of the Prior Art

Heretofore, pressure vessels or tanks or cylinders have been sealed under pressure. Screw plugs are inserted into drilled holes in the walls of various types of pressure vessels even in the presence of fluid pressure. Cracks and small holes in such vessels are closed by welding preferably by electric arc using appropriate rod materials.

Automobile gas filled hydro-pneumatic shock absorbers have cylinders loaded with a gas charge of about 150 psi. An aperture in the wall of the cylinder is tapered to receive spherical metal ball about one-eighth inch in diameter. Gas is loaded around the ball to a desired pressure, then the ball is electrically welded to the sides of the aperture causing the ball to bond to the cylinder. Electrical current at the interface between the cylinder is known to cause a resistance weld and bonding of the ball between the ball and the wall of the pressure vessel. This welding operation is known to create a heat affected area around the ball which is smaller and more stable than other forms of electrical rod welding which generates more heat in the welding operation.

In our parent copending application U.S. Ser. No. 08/005,584 there is shown and described a hybrid air bag inflator comprising a pressure tank and a differential pressure monitor switch mounted therein which is an improvement over U.S. Pat. No. 4,049,935. This latter patent describes a tank or pressure vessel associated with, and is a part of a pressure switch mounted inside of a larger chamber. The pressure vessel is described as being provided with a filling stem which is cut off and/or brazed or otherwise closed. Since the pressure in the pressure tank of such vessels is designed to exceed 2000 psi, it is desirable to provide a highly reliable seal or welded closure that does not leak and which has the minimum heat effect on the gas pressure in the pressure switch.

It would be desirable to provide a novel and improved closure apparatus for all types of pressure vessels which may be closed at an exact predetermined pressure with little or no pressure variation under mass production conditions.

SUMMARY OF THE INVENTION

It is a principal object of the present invention to provide a closure feature on a pressure vessel or a closure plug which may be reliably closed under pressure.

It is a principal object of the present invention to provide an apparatus and a method of sealing a pressure vessel at an exact predetermined critical pressure.

It is another principal object of the present invention to provide a miniature closure feature structure on a closure apparatus which may be closed under pressure without generating a heat affected area surrounding the closure of the type known to create gas leaks.

It is a principal object to provide a closure feature on a metal wall of a pressure vessel or on a closure plug which is provided with a small cylindrical capillary aperture therethrough which is closed by raising one end of the capillary to a molten state which causes the surface tension of the molten metal to close the capillary without generating a surrounding heat effected area which is prone to leakage.

According to these and other objects of the present invention an external wall of a gas filled pressure vessel is provided with a capillary filling and closure aperture. After filling the vessel with gas to a predetermined pressure, the end of the exposed capillary is rapidly heated to a molten state while the opposite end is maintained in a solid state. The molten end of the capillary closes due to surface tension of the molten metal. The molten end of the capillary is cooled to form a reliable seal with negligible effect on the gas pressure.

DETAILED DESCRIPTION OF THE PREFERRED EMBODIMENTS

Figure 1:
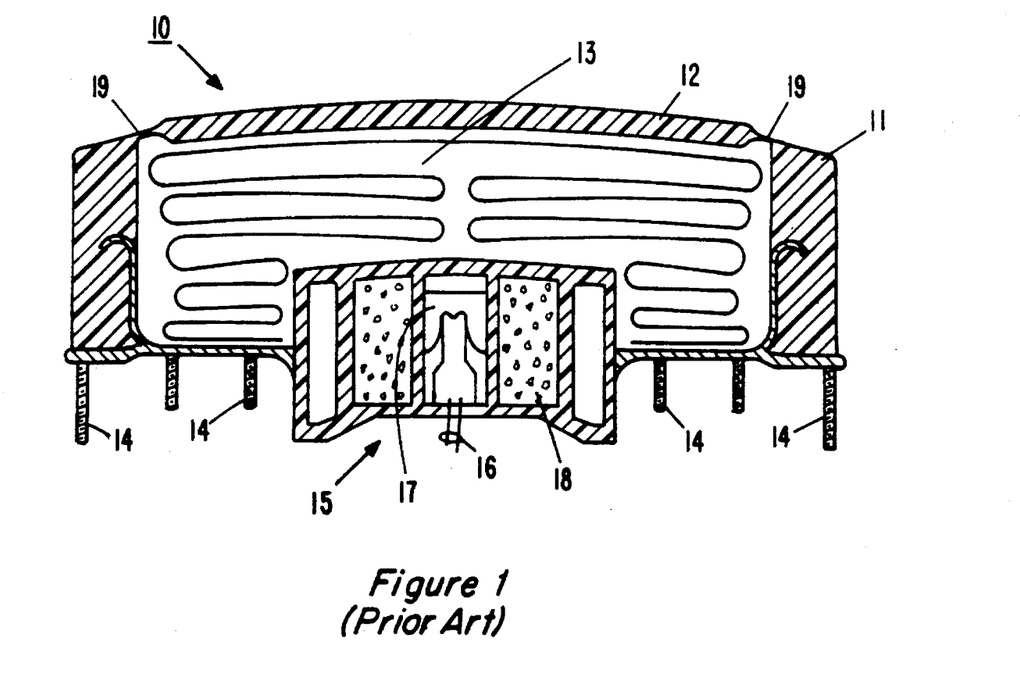
FIG. 1 is a schematic drawing in section showing a prior art pyrotechnic-type air bag inflator.

Refer now to FIG. 1 showing a schematic drawing in section of a prior art pyrotechnic-type air bag inflator 10. Inflator 10 comprises a body 11 for housing an air bag and is provided with a breakaway cover 12. The folded air bag 13 and housing 11 comprise a modular unit which is bolted onto a steering wheel or other part of a vehicle by means of bolts 14. Located centrally and below the folded air bag 13 is an igniter unit 15. The igniter unit 15 is connected by wires or leads 16 to a remote sensor (not shown) which may sense the deformation of a part of the vehicle or may sense a predetermined deceleration effect. The signal from the remote sensor first ignites the igniter charge 17 which in turn ignites the pellets of sodium azide 18 which generates a hot nitrogen gas which is filled with undesirable contaminants.

When the igniter 17 explodes, a large volume of hot gas enters the inner chamber of the folded air bag 13 and generates sufficient force for the cover 12 to be blown open at the breakaway edges 19. A known disadvantage of the prior art pyrotechnic type air bag inflator system is that the hot gases inside of the air bag bleed through either the material of the air bag or special vents provided therefor during the deflation mode of the air bag. In either event, the hot gases in the air bag are sufficient to create a situation where the hot air bag when engaging bare skin can cause burns. Further, when the prior art pyrotechnic type air bag inflator is placed on the passenger side, a large additional volume of hot gas is required to fill the space between the passenger and the housing mounted on the front dash of the vehicle. The requirement for a larger amount of hot gas further heats the air bag and generates a more dangerous condition than that which existed on the driver's side.

Figure 2:
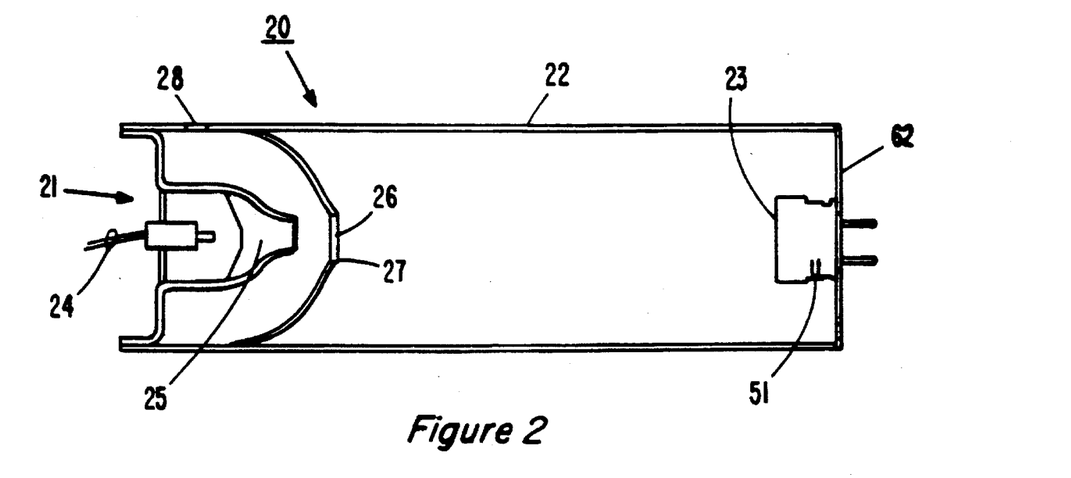
FIG. 2 is a schematic drawing in section showing a low cost hybrid-type air bag inflator which employs a combination of a pyrotechnic igniter and an inert gas stored under pressure in a pressure tank which is provided with a system readiness monitor.

Refer now to FIG. 2 showing a schematic drawing in section of a low cost hybrid-type air bag inflator 20 which comprises a small pyrotechnic igniter 21 and an inert gas stored in a tank 22 which is provided with a system readiness monitor 23. In the preferred mode of operation, a remote sensor (not shown) is coupled by electrical wires 24 to the igniter system 21 and when an accident condition is sensed, the igniter activates a pyrotechnic heater generator 25 which ruptures a burst disk 26 separating the igniter from the gas in tank 22. The inert type gas in the tank 22 starts to escape through the aperture 27 and the exit aperture 28 before the gas generator 25 has completely heated the gas inside the tank 22. Thus, it will be understood that once the burst disk 26 is removed, the velocity of the gas from the gas generator 25 is initially sufficient to charge into the tank 22 and heat the gas before the gas has a chance to escape, thus the mode of operation of the escaping gas is similar to a counterflow heat exchanger. The hybrid-type inflator has the advantage that a small amount of pressurized gas may be placed inside of tank 22 and when heated generates a sufficient large supply of moderately heated gas that is coupled to and is capable of inflating a folded air cushion 13 (not shown) located on the passenger side of a vehicle. Further, the system shown in FIG. 2 may also incorporate a sensor to provide an integral unit which is located remote from the location of the air bag that may be located behind a decorative panel on the passenger's side of the vehicle. Further, since the inflator portion of the hybrid-type air bag device may be located remote from the air bag, it is now possible to place air bags in a position opposite the passengers in the rear seat of a vehicle to ensure that they too are protected from injuries which occur during severe accidents.

Figure 3:
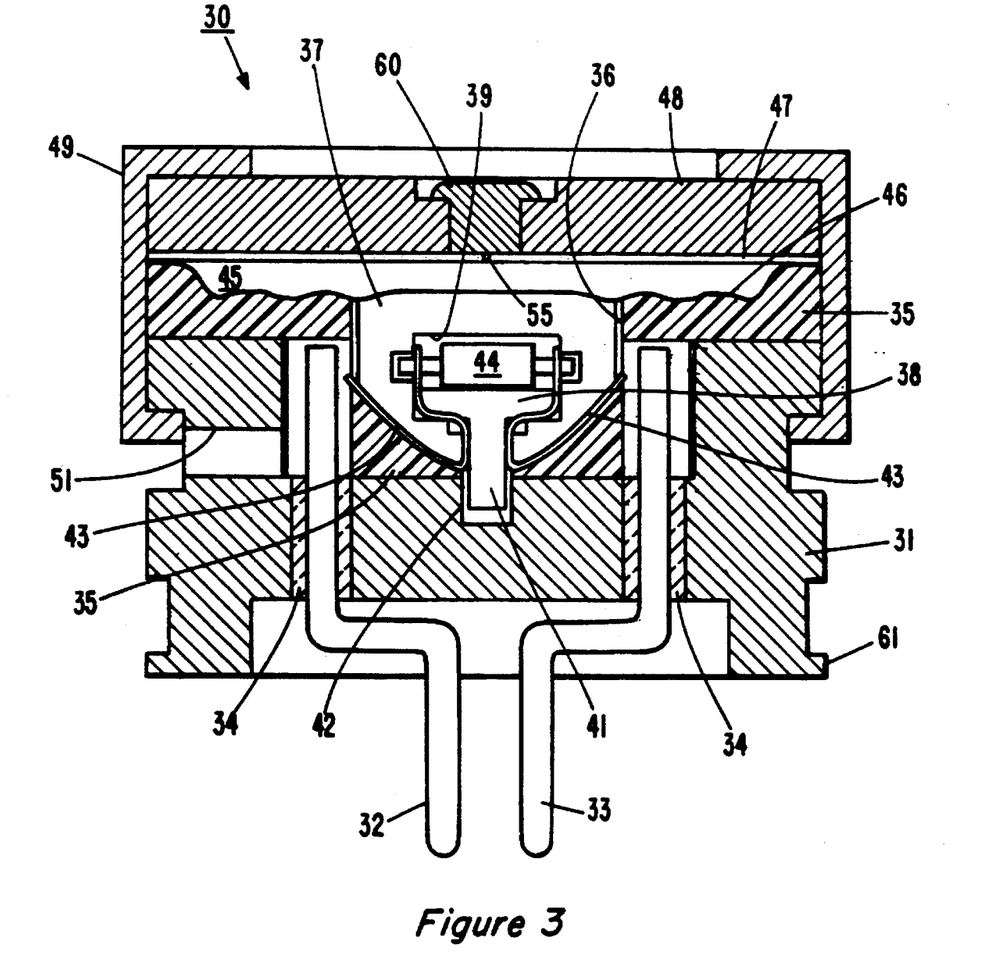
FIG. 3 is a schematic drawing in section of the preferred embodiment system readiness monitor shown in FIG. 2 and further showing a novel differential pressure switch in an open circuit condition.

Refer now to FIG. 3 showing a schematic drawing of the preferred embodiment system readiness monitor 23 shown in FIG. 2. The preferred embodiment readiness monitor 23 comprises a switch body 31 through which electrical leads 32 and 33 pass from outside to a position inside of the body and are sealed with insulating glass to metal seals 34. Physically located on top of switch body 31 is a mandrel 35 which is provided with a central recess 36 into which a piston body 37 is slidably guided. The piston body 37 is shown having a separate plug element 38 which fits inside of a slot or recess 39 in the piston body 37. The plug element 38 preferably is provided with all extension or guide pin 41 which extends into a guide recess 42 in the mandrel 35 and/or switch body 31. A pair of symmetrical leaf springs 43 are formed to fit between the piston body 37 and the plug element 38. The plug element (or the body 37) is preferably provided with slots to hold and stabilize the leaf spring. When the plug element 38 slides into the recess 39, the leaf springs 43 are held in place. A fault isolation resistor 44 is shown connected between the two leaf springs 43 and permit sensing of the difference between a short and a continuous electrical path at the leads 32 and 33. A novel capsule or module 45 comprises a flexible diaphragm or bottom plate 46 and a rigid or fixed plate 47 which is held in place by a rigid cover or top plate 48 which is coupled or held to the switch body 31 by a retainer 49. In the preferred embodiment shown in FIG. 3, the readiness monitor 23 operates as a differential pressure monitoring switch where the outside pressure to be monitored has access to the bottom of flexible diaphragm 46 via an access hole 51. When the switch 23 is first mounted inside of the tank 22 shown in FIG. 2, the pressure inside of module or capsule 45 is greater than the pressure inside of the tank 22 and the switch contacts 43 are normally open as shown in FIG. 3.

The pressurized gas inside of module 45 must be inserted as a gas after the switch 23 is assembled with the retainer 49 attached. For the purpose of filling and sealing the module 45 with a high pressure gas approaching 3,000 pounds per square inch, an access plug 60 is provided. The details for filling the capsule 45 via small hole 55 will be explained in greater detail hereinafter.

Figure 4:
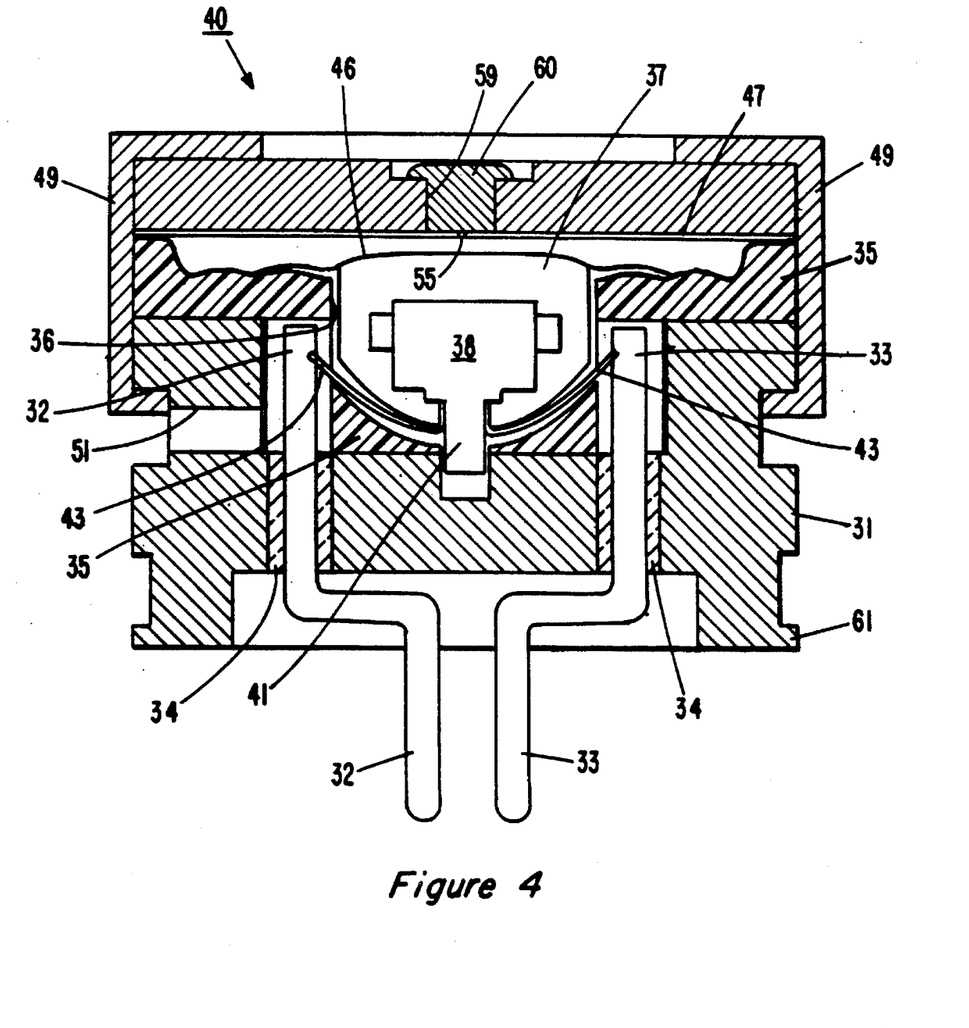
FIG. 4 is a schematic drawing in section of the monitor shown in FIG. 3 with the differential pressure switch in a normally closed circuit condition.

Refer now to FIG. 4 showing a schematic drawing in section of the preferred embodiment monitor 23A after the differential pressure in the tank 22 has been raised to a pressure exceeding the pressure in the capsule 45 permitting the piston body 37 to be raised in the recess 36 in the mandrel 35 which extends the leaf spring 43 horizontally outward to engage the upper portions of the leads 32 and 33 and to create a continuous electrical path therebetween. It will be noted in the preferred embodiment switch shown in FIGS. 3 and 4 that the leaf springs 43 serve two functions. The leaf springs form the continuous path between the leads 32 and 33 and further provide a spring bias which urges the piston 37 against the bottom plate 46 of the capsule 45. Thus, it will be understood that a simple coil spring could be substituted for the novel leaf spring 43 to provide an upward bias on the piston 37. Further, a single leaf spring 43 could be employed in conjunction with a flexible electrical wired connection between a lead 32 and 33 and one leaf spring 43. It has been found more desirable to provide two insulated leads 32 and 33 rather than use the switch body 31 as an electrical path. In the FIG. 4 embodiment, the elements explained with reference to FIG. 3 that are identical to the elements shown in FIG. 4 and have been numbered the same and do not require further explanation.

The capsule 45 shown in FIG. 4 has the flexible bottom plate 46 urged upward allowing the spring contacts 43 to form a completed circuit between the electrical leads 32 and 33. The resistance measured at leads 32, 33 will permit confirmation of the spring contacts 43 being closed.

In a fail safe mode, a leak in capsule 45 allows the diaphragm 46 to move downward which opens the closed contacts 43. The same result occurs when the tank 22 loses critical operating pressure. In either event the tank 22 with its system monitor 23 inside can be speedily replaced more economically than replacing a complete air bag inflation system. Leads 32, 33 are preferably connected to a light indicating instrument which lights up to indicate that a fail safe event has occurred.

Figure 5:
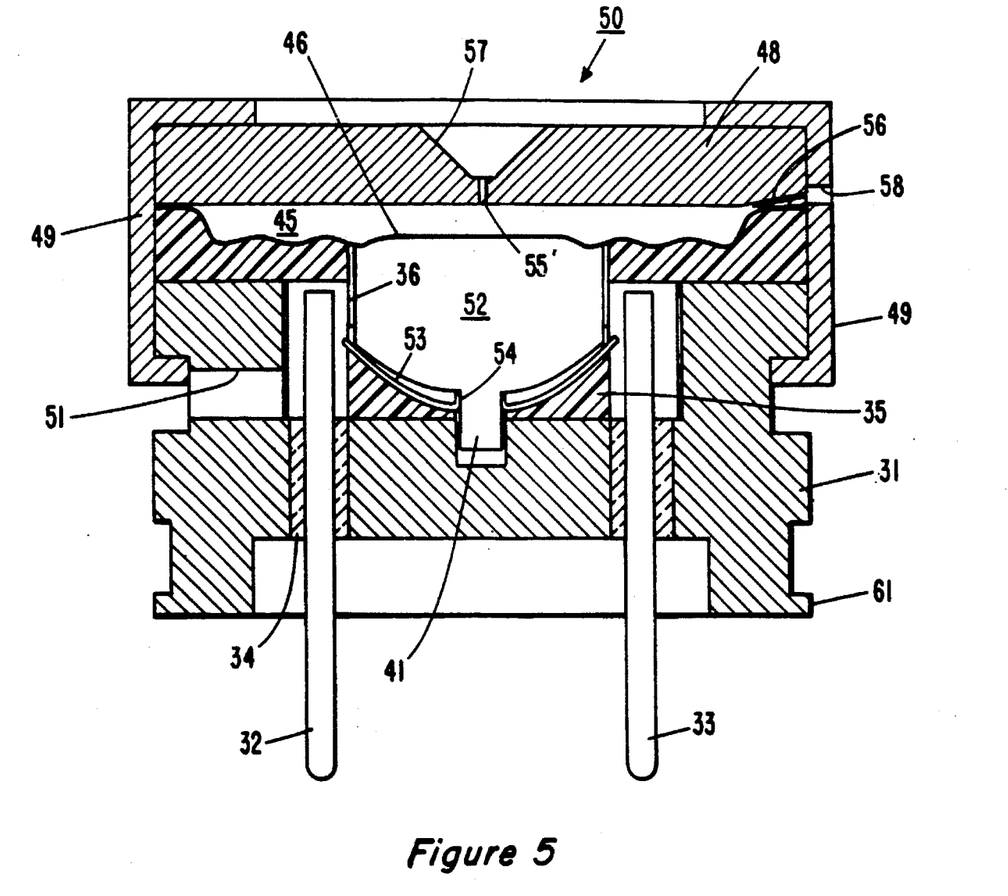
FIG. 5 is a schematic drawing in section of a modified differential pressure monitoring switch having the same mode of operation as the switch shown in FIGS. 3 and 4.

Refer now to FIG. 5 showing a schematic drawing in section of a modified differential pressure monitoring switch 50. In this embodiment, the plate 47 of the module 45 has been removed and its function is provided by the cover plate 48. Instead of connecting the bottom plate 46 of the module 45 to the plate 47, the flexible diaphragm 46 is now connected to the top plate 48. In this modified embodiment the fault isolation resistor 44 may be removed for purposes of economy. In this event, the piston body 37 and the piston plug 38 may be combined as an integral unit to provide further economies of manufacture. Further, the two leaf springs 43 shown mounted on the piston plug 38 may be replaced with a single spring 53 which is provided with a raised annular collar 54 which provides centering and stability when mounted on the guide pin 41. It has been found through experimentation that a continuous leaf spring with no annular collar may be placed in guide slots and the mandrel 35 and the guide pin 41 may be eliminated and still provide a perfectly operable structure.

As mentioned hereinbefore, it is necessary to fill the capsule or module 45 with a gas which is preferably inert to a pressure approaching 3,000 pounds per square inch. In the preferred embodiment method of filling the capsule 45 to the desired threshold pressure, there is provided a capillary size hole 55, 55' or 56 in the top plate 47 or 48. After filling the capsule 45 to the desired pressure, the capillary 55' or 56 may then be closed by heating the capillary size hole with a laser or other means through the access holes 57 or 58 respectively.

It will now be appreciated that the access plug 60 shown in FIGS. 3 and 4 is a part of the top plate 48 when the capillary access hole 55' is provided in the top plate 48 of the module 45. Thus, if the access hole 59 for the access plug 60 is made small enough, the plug 60 and plate 47 may be eliminated entirely.

Figure 6:
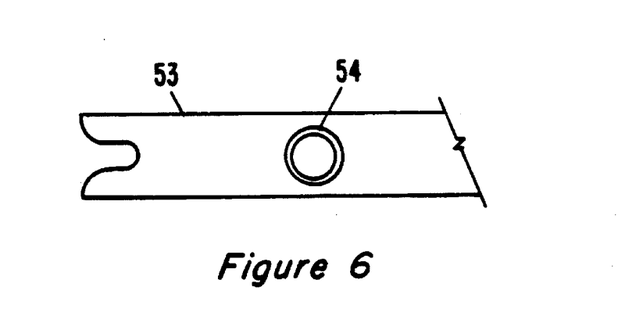
FIG. 6 is a partial plan view of a modified flexible leaf spring employed as a switch contact in the switch shown in FIG. 5.

Refer now to FIG. 6 showing a partial plan view of a modified flexible leaf spring 53 having an aperture at collar 54. The raised collar 54 may be completely removed when the spring 53 which is fitted into slots in either the mandrel 35 or the body plug 52 and is stabilized to prevent horizontal movement.

It is a feature of the present invention to be able to fill the module 45 to a predetermined pressure which compensates for variation in the linear displacement of the flexible diaphragm 46 as well as the sum of all the variable tolerances between the spring contacts 43 and the leads 32 and 33. For example, it is desired to switch the contacts 43 of the novel switch from its normally closed position to an open position when the pressure in the tank 22 falls below a predetermined preselected value. This can be done by making some adjustment in the pressure that is employed in the capsule 45. When the novel method of filling the module 45 is employed, it is no longer necessary to provide any other switch adjustment.

In the preferred embodiment method of filling the module 45, the module 23, 40 or 50 is placed in an environment that simulates the desired minimum pressure inside of the tank 22 at the desired switch point to be monitored. First, the operation of the contacts 43 and 53 are checked by engaging and disengaging the contacts with the leads 32 and 33. Once the contacts are engaged against the pins 32 and 33, the module 45 is filled to a point where the contacts first open, then the module is sealed at that pressure regardless of the pressure differential because it is known that at this particular point or pressure, the module is sensing the desired threshold or lower pressure to be monitored in the tank 22.

In the preferred embodiment method of sealing the gas in the module 45, the capillaries 55, 55' or 56 are closed by heating the capillary with a pulsed laser which causes the metal surrounding the capillary to collapse into the capillary and seal the module.

Figure 7:
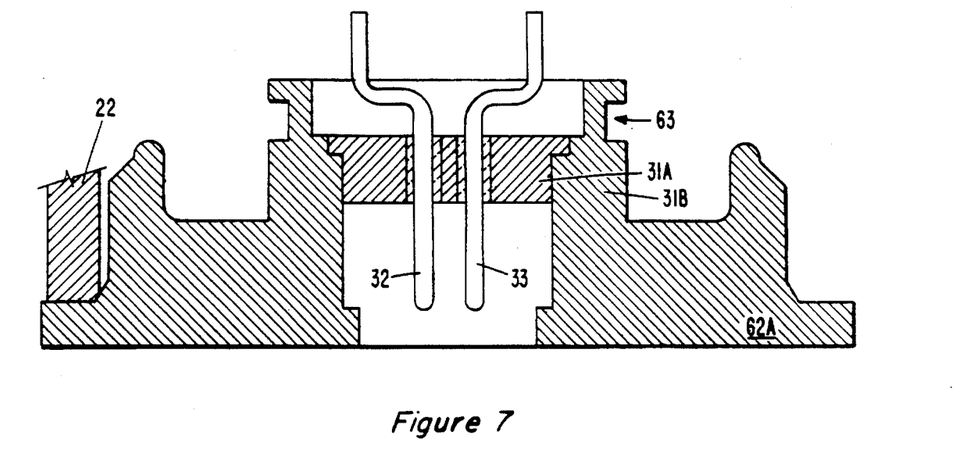
FIG. 7 is a schematic drawing in partial section showing a modified switch body which is integrated into an end closure of the pressure tank shown in FIG. 2.

Refer now to FIG. 7 showing a partial section of a part of a monitor switch 23B having a modified body 31A, 31B. In this embodiment the lower portion of the switch body 31A is shaped to attach to a matching recess in an end closure 62A of the gas tank 22. The groove 63 of the body 31B is adapted to receiver the retainer 49 of the type shown in FIG. 4. The advantage of this modification is that it permits the systems monitor 23 to be manufactured at less expense as a part of an end closure 62 which is ready to attach to a tank 22 prior to filling the tank.

Figure 8:
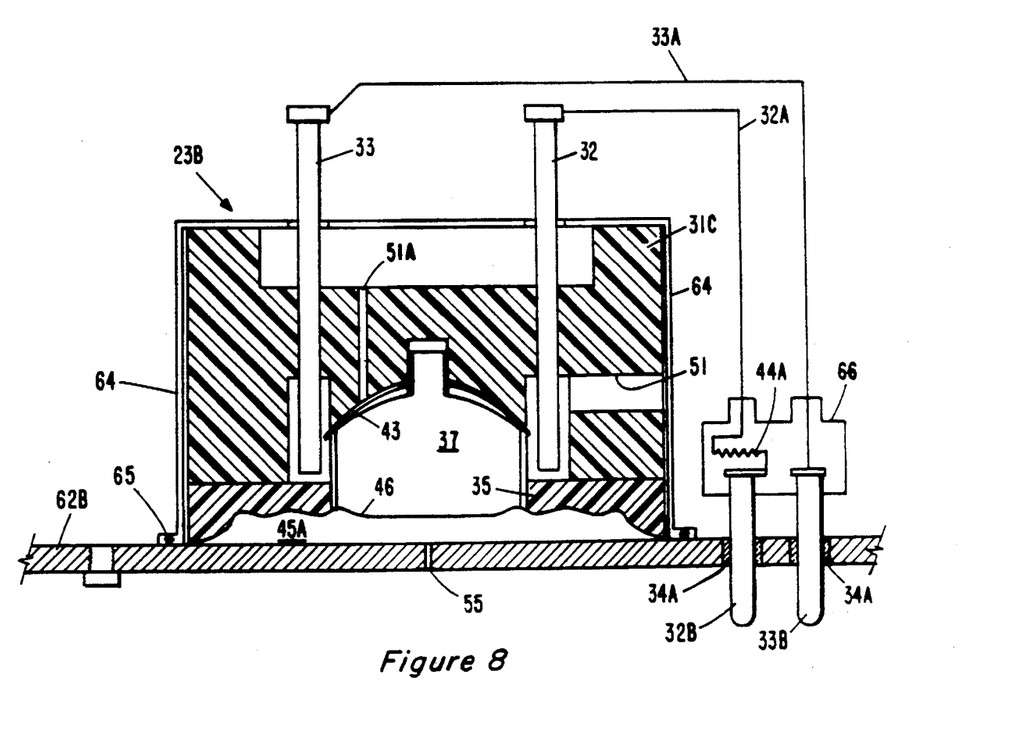
FIG. 8 is a schematic drawing in partial section showing another modified switch body which is integrated into an end closure of the pressure tank.

Refer now to FIG. 8 showing a partial section of a part of another modified monitor switch 23B having a modified body 31C. In this embodiment the flexible bottom plate 46 is attached directly to an end closure 62B to form a capsule 45A. The piston body 37 is shown in its extended position which forces the leaf spring contacts 45 against the switch body 31C and opens the electrical circuit between electrical leads 32 and 33. The body 31C is preferably made from an electrically insulating plastic which eliminates the need for the glass seals 34 in the body. The mandrel 35 is shown as a separate piece, but may be made integrally with the body 31C.

Access holes 51 and/or 51A are provided in the body 31C so that gas pressure in tank 22 freely communicates with the outside of flexible diaphragm 46. The advantage of this modification is that monitor 23B is made with fewer parts and the parts are also designed for lower production cost. For example, the body 31C and mandrel 35 can be made as a single injection molded part which is held in place against end closure 62B by a formed retainer or band 64 that is preferably attached to the end closure 62B by welds 65. This modification also eliminates the top plate 47.

An electrical connector 66 is shown having leads 32A and 33A connected to leads 32 and 33, respectively, which interconnects with leads 32B and 33B that extend through end closure 62B. The leads 32B and 33B may be extended through the cylindrical wall of tank 22 instead of end closure 62B. The leads are preferably insulated and sealed at the exit wall by glass to metal seals 34A to provide ease of connection of a snap on connector (not shown). A fault isolation resistor 44A may be provided connected in series and mounted on the internal connector 66. The same resistor may be mounted on the external connector (not shown).

In this embodiment, the monitor may be made very small even though the pressure in capsule 45A and tank 22 are in the range of 3,000 pounds per square inch. This is accomplished by filling tank 22 and capsule 45A simultaneously so that the differential pressure is greatly reduced. A tank plug 67 with a capillary hole 55 and hole 55 are provided in the end closure 62B for simultaneously filing testing and sealing the gases inserted in capsule 45A and in tank 22 (not shown) which surrounds module 23B.

It will be understood that the novel differential pressure monitoring switch may be made and sealed as a unit before being installed inside of the tank 22. A preferred method of installing the switch 23, 40 or 50 in the tank 22 is to provide a welding ring 61 which may be welded against the end 62 of the tank 22 prior to welding the enclosure 62 to the cylindrical portion of the tank 22.

In the modified embodiment shown in FIG. 8, the monitor switch 23B is made as an integral part of the end closure 62 of tank 22 and is filled subsequent to the mechanical assembly of the inflator 20 shown in FIG. 2.

The novel capillary apertures 55 and 56 shown in FIGS. 3 to 5 and 8 may be made by very small drills, however, it has been found that the apertures can be made and their size controlled using a high energy laser such as a CO₂ laser or preferably a pulsed glass laser having a beam convergence control as will be explained hereinafter.

When the size of the capillary is made large, it reduces the time for filling the pressure vessel, however, the larger the capillary the greater the amount of molten metal required to close the capillary. The larger amount of molten metal also requires more energy and more time in production and also increases the chances of forming a heat affected area with cracks which sometimes leak. It was found that a closure feature at one end of the exposed capillary could be rapidly melted and cooled in a manner which closed a relatively long portion of the elongated capillary aperture in the closure features to be described hereinafter.

Figure 9:
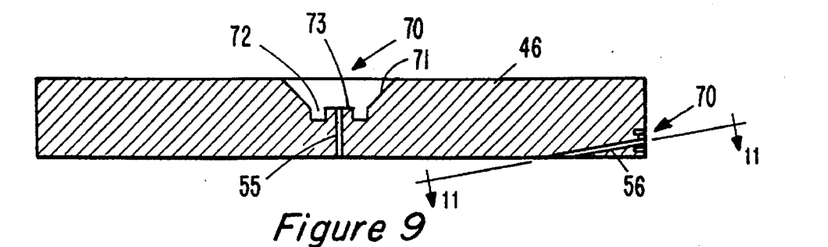
FIG. 9 is an enlarged detail drawing of the top plate of FIG. 5 showing a closure feature on the two capillaries.

Refer now to FIG. 9 showing an enlarged detailed drawing of the top plate 46 of FIG. 5 showing a closure feature 70 which comprises a tapered recess 71 and annular ring 72 and a cylindrical raised protrusion 73 through which the capillary 55 extends. The protrusion 73 rises above the adjacent metal wall at ring 72 and is provided at the open or exposed surface of the top plate 46. An alternative capillary 56 is shown extending through the side of the top plate 46 and is also provided with a closure feature 70.

Figure 10:
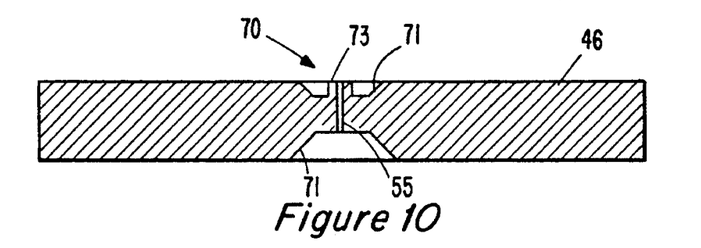
FIG. 10 is an enlarged detail drawing of the top plate of FIG. 5 showing another closure feature on the preferred center capillary.

Refer now to FIG. 10 showing an enlarged detailed drawing of the same top plate 46 having a modified closure feature 70 which comprises a tapered recess 71 which extends to the bottom of the annular ring 72 to provide an exposed raised protrusion 73 above ring 72 of the metal wall or plate 46. The elongated length of the capillary 55 is made shorter when the top plate 46 is thick by forming a tapered recess 71 on the bottom surface of the plate 46 shown in FIG. 10.

Figure 11:
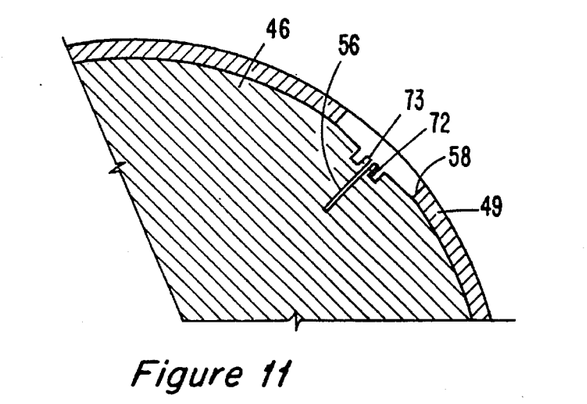
FIG. 11 is an enlarged partial detail at section 11—11 of FIG. 9 showing a closure feature on the side capillary.

Refer now to FIG. 11 showing an enlarged partial detail taken at Section 11—11 of FIG. 9 and showing a closure feature 70 on the side of the top plate 46. The closure feature is provided in an opening 58 of the retainer 59 shown in FIG. 5 and comprises an annular ring 72 and a raised protrusion 73 as explained hereinbefore.

Figure 12:
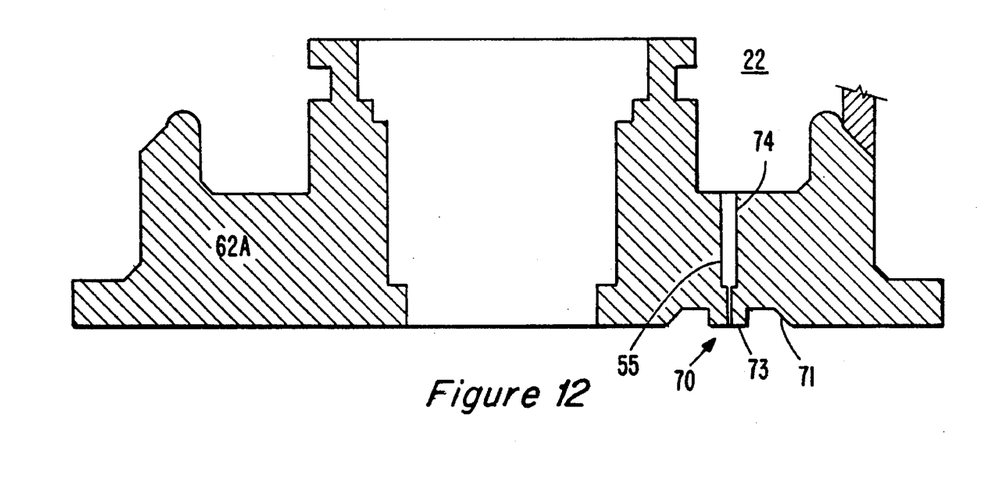
FIG. 12 is an enlarged detail drawing of the end closure of FIG. 7 showing a closure feature and a capillary.

Refer now to FIG. 12 showing an enlarged detailed drawing of the enclosure 62A shown in FIG. 8. A preferred closure feature 70 is shown having a tapered recess 71 and a raised protrusion 73. The preferred size capillary 55 is shown connecting with an elongated drill hole 74 which extends inside of the tank 22.

Figure 13:
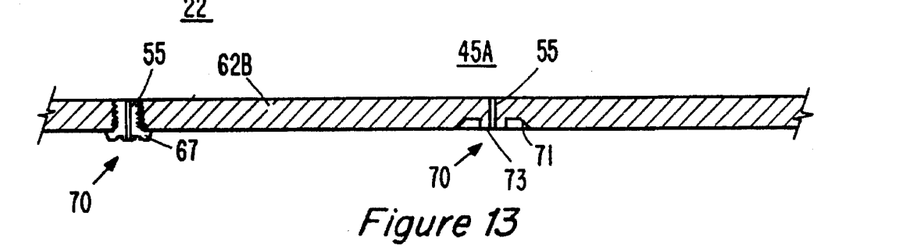
FIG. 13 is an enlarged detail drawing of the end closure of FIG. 8 showing two closure features, one in the container wall and a closure plug in the container wall.

Refer now to FIG. 13 showing an enlarged detail of the enclosure 62B of FIG. 8 showing two closure features 70 in the container wall. The closure plug 67 is shown provided with a closure feature 70 and a capillary 55 which extends from the outside into the interior of the tank 22 (not shown). The second closure feature 70 is shown having a raised cylindrical protrusion 73 and a tapered recess 71 similar to that shown in FIG. 9 which communicates with the inside of the capsule 45A as shown in FIG. 8. It will be understood that the closure feature 70 could be similar to that shown in FIG. 10 if the access to the inside and outside of the tank or vessel 22 permits machining on the inside surface.

Figure 14:
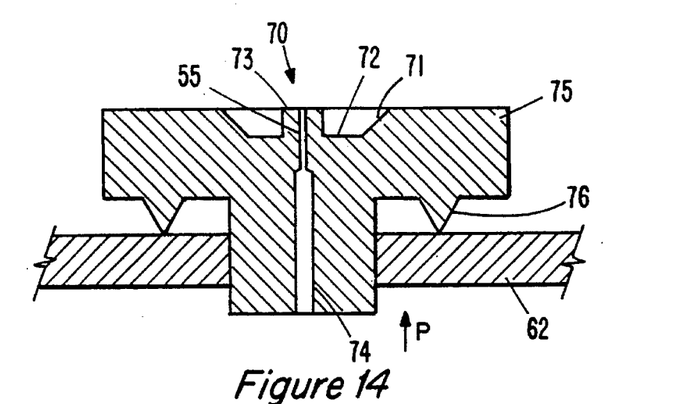
FIG. 14 is an enlarged detail in section of a closure plug having resistance welding protrusions for attachment to a container or vessel wall.

Refer now to FIG. 14 showing an enlarged detail in section of a closure plug 75 having resistance welding protrusions 76 thereon. The closure feature 70 on the closure plug 75 comprises a raised protrusion 73, annular ring 72 and a tapered recess 71 similar to the closure feature 70 described hereinbefore. The capillary 55 is shown extending approximately twice the diameter of the protrusion 73 into the closure plug body 75 where it connects with a drill hole 74. It is possible to drill a larger hole 74 through a major portion of the body 75 and join this drill hole with the preferred embodiment capillary to be described hereinafter. When the protrusions 76 are melted during resistance welding, the major portion of the body 75 matches flush upon the wall 62.

Figure 15:
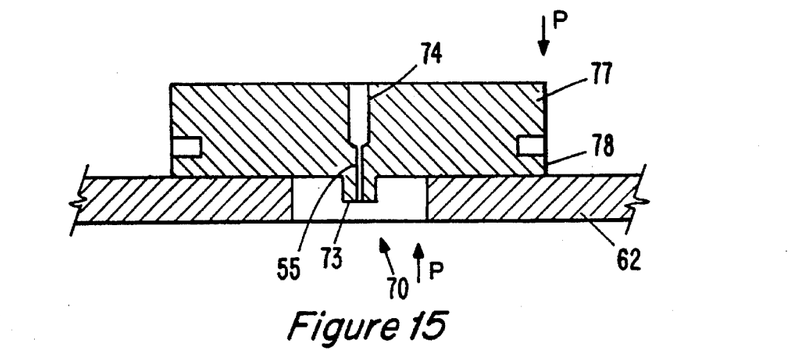
FIG. 15 is a schematic drawing in section of a simplified closure plug having a welding ring.

Refer now to FIG. 15 showing an enlarged schematic drawing in section of a simplified closure plug 77 having a welding ring 78 of the type shown in FIGS. 3 and 5 for rodless welding the ring 78 to the plate 62. Such rings are known in the prior art and may be welded by rodless welding such as laser TIG or plasma welding. The closure feature 70 comprises a protrusion 73 extending from the body 77 and further includes a capillary 55 which extends into the cylindrical drill hole 74. The closure plug 77 may be centered over the access hole in plate 62 by a chuck or other means not shown.

Figure 16:
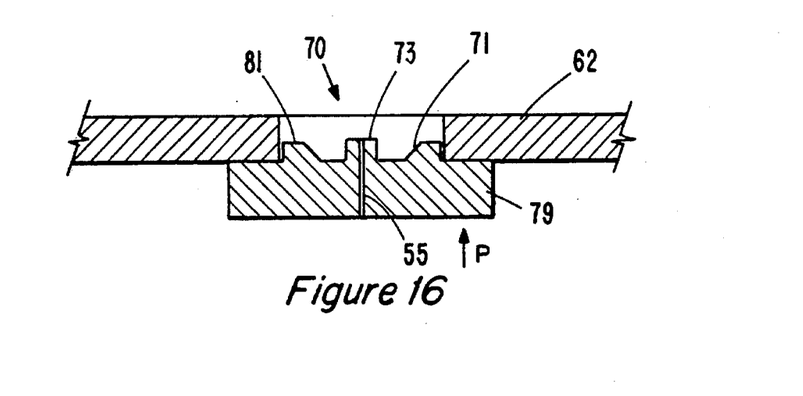
FIG. 16 is a schematic drawing in section of a closure plug having raised positioning guides.

Refer now to FIG. 16 showing a schematic drawing in section of a closure plug 79 having a capillary 55 therethrough. The closure feature 70 comprises a raised protrusion 73 and a tapered recess 71 which has an edge feature or positioning ring 81 for positioning the plug 79 in the plate 62.

Figure 17:
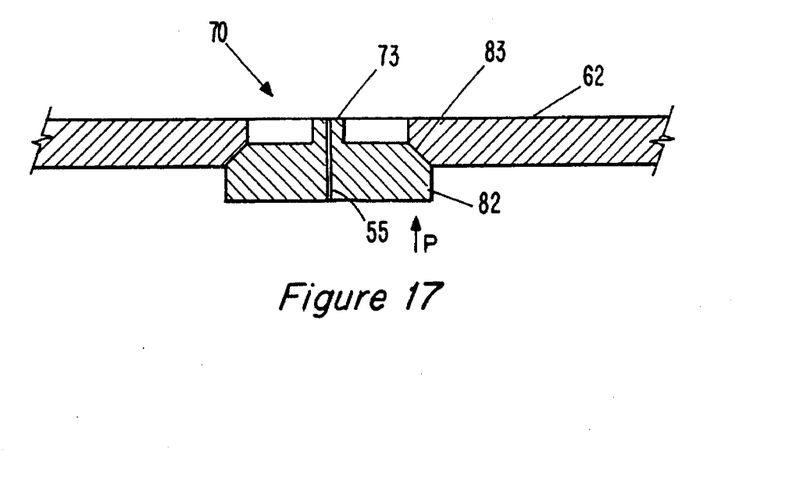
FIG. 17 is a schematic drawing in section of a closure plug having beveled or recessed positioning guides.

Refer now to FIG. 17 showing a schematic drawing in section of another closure plug 82 having a tapered or beveled recess positioning ring 83 for positioning the plug 82 in the plate or wall 62. The closure feature 70 is provided with a raised protrusion 73 through which the capillary 55 extends to the exposed end as explained hereinbefore.

Figure 18:
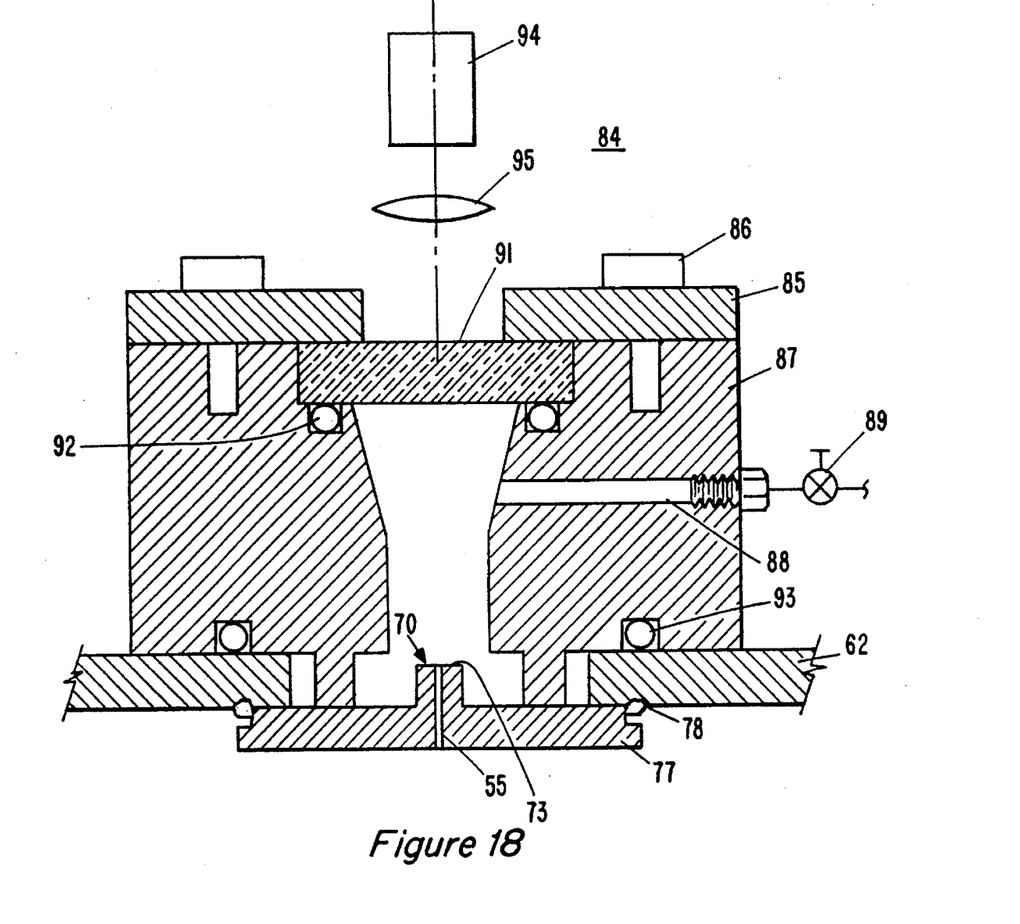
FIG. 18 is a schematic drawing in section showing a laser welding and gas filling adapter for sealing a closure plug with a closure feature.

Refer now to FIG. 18 showing a schematic drawing of a laser welding and gas filling adaptor 84. The adaptor 84 comprises a clamp or holding plate 85 mounted by bolts 86 to the adaptor block 87. The adaptor block 87 is provided with a gas inlet passageway 88 which connects through a valve 89 to a source of gas under pressure. A glass window 91 is sealed against the adapter block 87 through means of 0 rings 92 and the adaptor block is sealed against the vessel wall 62 by means of 0 ring 93.

In the preferred embodiment a high energy glass laser 94 of the type sold by Coherent General in Massachusetts is employed to generate sufficient energy to reduce the exposed end 73 of the closure feature 70 to a molten state with a single burst of timed energy over several milliseconds. Focusing means 95 are provided between the laser 94 and the window 91 to concentrate or to disperse the laser beam to completely cover the top surface of the closure feature 70 when performing a closure operation to be explained in greater detail hereinafter.

Figure 19:
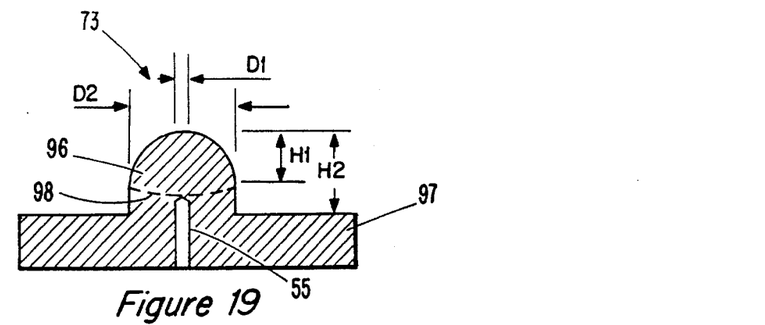
FIG. 19 is a schematic drawing in section of a solidified hemispherical bubble which forms a capillary seal on a closure feature.

Refer now to FIG. 19 showing a schematic drawing of a solidified convex bubble 96 formed on a closure plug 97 of the type having a raised protrusions 73 as part of the closure feature 70. It will be noted that the preferred shape of the protrusion 73 is cylindrical so that the width of the protrusion 73 may be referred to as having a diameter D2 which may be as wide as one-half inch in the preferred embodiment but may be smaller or larger as will be explained. The capillary 55 is shown having a diameter D1 which may be as large as ⅛" but is preferably smaller than 9/1000ths of an inch when employing a closure plug of the type shown in FIG. 19. The height of the hemispherical solidified shape 96 completely closes the upper portion of the capillary 55 and leaves a heat affected zone in the raised protrusion 73 as shown at line 98. By providing the raised protrusion 73 at a height H2 which is greater than the height H1 of the hemisphere 96, the heat affected zone 98 is maintained clear of the body of the closure plug 97 where cracks and leaks could occur.

Figure 20:
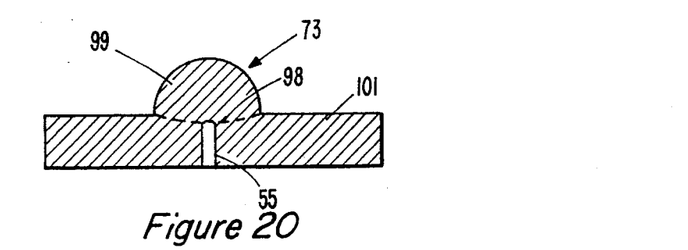
FIG. 20 is a schematic drawing in section of a solidified hemispherical bubble which also forms a capillary seal on a short closure feature.

Refer now to FIG. 20 showing a schematic drawing in section of another solidified convex bubble 99 which was made with a short protrusion 73 which caused the heat affected zone 98 to form into the body of the closure plug 101. Had the amount of heat transferred to the closure feature 70 exceeded a critical minimum, the heat affected zone 98 would progress downward and outward, causing the hemispheric bubble to enlarge radially and be reduced in height which could cause additional heat affected zones and cracks extending radially from the capillary 55.

Figure 21:
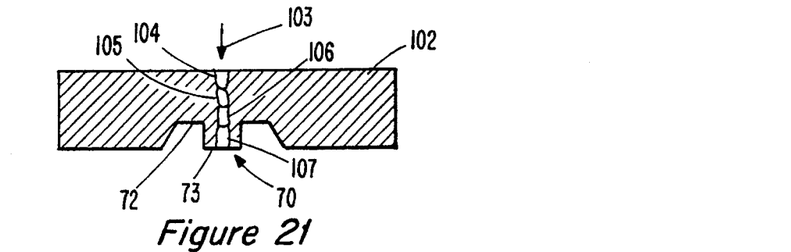
FIG. 21 is a schematic drawing in section of a closure plug showing successive cuts made with a pulsed laser to form a capillary.

Refer now to FIG. 21 showing a schematic drawing in section of a closure plug 102 having a closure feature 70 which comprises a raised protrusion 73 and an annual ring 72 surrounding the protrusion. When a concentrated and focused laser beam is projected onto the back side of the plug 102 as shown by the arrow 103, it is possible to vaporize a small cylindrical portion of a capillary as shown at the stacked cylinders or apertures 104 to 107. By focusing the laser beam 103 and maintaining the energy level of the focused beam at a desired point, the diameter of a series of cylinders 104 to 107 may be maintained from less than 1/1000th of an inch up to and including approximately 10/1000th of an inch. A laser can drill a desired long capillary elongated cylinder in a solid closure plug of the type shown in FIGS. 14 through 21.

When the raised protrusion 73 and capillary 55 are enlarged beyond the power of the laser 94 to control the hemispherical bubble 99 or 96, it is necessary to employ another form of welding such as tungsten inert gas (TIG) which is capable of much higher energy levels. When this is done the window 91 in the adapter block 87 must be replaced with a fixture which holds a sealed tungsten inert electrode at a desired prepositioned distance above the closure feature 70 in order to create a hemispherical closure bubble 96, 99 as explained hereinbefore.

Figure 22:
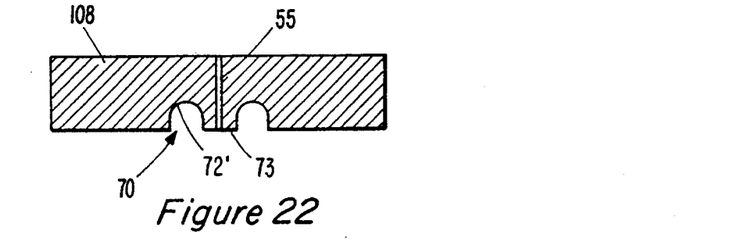
FIG. 22 is a schematic drawing in section of a closure plug showing a modified closure feature.

Refer now to FIG. 22 showing a schematic drawing in section of a closure plug 108 having a closure feature 70 which comprises a raised protrusion 73 and an annular ring 72' surrounding the protrusion which has a rounded cut in the bottom of the recess. This rounding feature causes incident light directed onto the ring area to be disbursed so that the light reflected from annular ring 72' is not directed back into a pattern recognition system (PRS). This condition creates a light/dark transition area at the edges of the protrusion 73 which is more easily distinguished by a conventional PRS of the type used for automatically locating the position of the features 55, 72' or 73.

Figure 23:
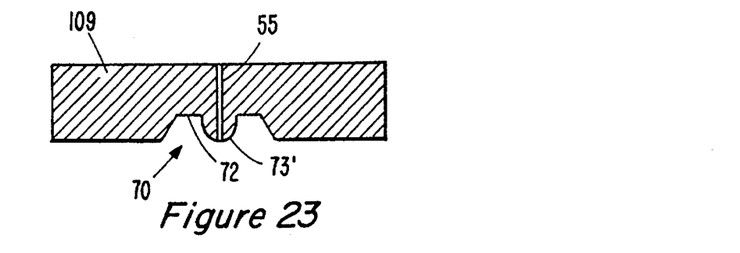
FIG. 23 is a schematic drawing in section of a closure plug showing another modified closure feature.

Refer now to FIG. 23 showing a schematic drawing in section of a closure plug 109 having a closure feature 70 which comprises an annular ring 72 and a protrusion 73' which has a rounded end or top. This rounded feature causes incident light directed onto the protrusion to be disbursed so that the light reflected from the protrusion 73' is not directed back into a PRS of the type used for automatically locating the position of the features 55, 72 or 73'.

Having explained several different closure features and closure plugs incorporation capillaries, it will be appreciated that welding such closure features is not limited to TIG welding or laser beam welding but may be conducted using other forms of welding such as plasma and electron beam as well as some forms of resistance welding. However, the preferred embodiment of the present invention contemplates using the minimum amount of energy associated with a small closure feature provided with a very small capillary aperture 55 so that the heat affected zone which causes cracks in the plates and diaphragms in the vessels and monitoring devices shown in FIGS. 1 to 8 can be made in high production with extremely reliable pressures inside the vessels and capsules as well as eliminating cracks or fissures which could result in leaks that would destroy the devices for their intended use.

What is claimed is:

1. Apparatus for sealing a vessel under pressure, comprising:

a closure plate having a metal wall to be sealed, a raised closure feature on said wall to be sealed comprising a symmetrical protrusion having a small diameter elongated capillary aperture less than one ten thousandths of an inch extending completely through the raised closure feature and said metal wall before being sealed, and said raised closure feature having a symmetrical protrusion rising above the adjacent metal to enable an exposed end of the protrusion to be heated to a molten state before said adjacent metal wall to permit solidification of the molten end of the protrusion to form an imperforate end closure of said capillary aperture.

2. Apparatus as set forth in claim 1 wherein said capillary aperture is at least as long as the largest width of said symmetrical protrusion.

3. Apparatus as set forth in claim 1 wherein said raised closure feature is cylindrical in shape and extends within a recess in said adjacent metal wall to a height equal to at least one diameter of said cylindrical shape.

4. Apparatus as set forth in claim 1 wherein said raised closure feature comprises a symmetrical protrusion having a rounded end for disbursing incident light.

5. Apparatus as set forth in claim 1 wherein said raised closure feature comprises a ridge recessed in said metal wall surrounding said symmetrical protrusion, and wherein the bottom of said ridge is rounded for disbursing incident light.

6. Apparatus for sealing a container under pressure, comprising:

a closed container having a plurality of imperforate metal walls for maintaining a gas under pressure, a capillary aperture extending outward through an exposed wall of said container, said capillary aperture providing part of an elongated cylindrical shape closure feature having an end opening for filling and sealing said container, said capillary aperture being smaller than ten one thousandths of an inch in diameter, and said wall surrounding said capillary aperture and having an open end with the physical characteristic of collapsing and closing when the exposed wall surrounding the open end of said capillary aperture is raised to a molten state.

7. Apparatus as set forth in claim 6 wherein the end of said capillary aperture which extends through said exposed wall is further provided with a raised closure feature.

8. Apparatus as set forth in claim 7 wherein said raised closure feature comprises an annular ring removing removed from the exposed wall surrounding said raised closure feature.

9. Apparatus as set forth in claim 1 wherein said metal wall of said closure plate to be sealed comprises a closure plug, said closure plug having means for being attached in an aperture in the wall of the vessel to be sealed.

10. Apparatus as set forth in claim 9 wherein said means for being attached in said aperture comprises a welding feature on said closure plug adapted to be melted and welded into said metal of said closure plate to be sealed.

\* \* \* \* \*